United States Patent [19]

Hörmann

[11] Patent Number: 4,564,098

[45] Date of Patent: Jan. 14, 1986

[54] DRIVE ASSEMBLY FOR DOOR OPERATOR

[75] Inventor: Michael Hörmann, Steinhagen, Fed. Rep. of Germany

[73] Assignee: Hormann KG, Harsewinkel, Fed. Rep. of Germany

[21] Appl. No.: 386,581

[22] Filed: Jun. 9, 1982

Related U.S. Application Data

[63] Continuation-in-part of Ser. No. 162,088, Jun. 23, 1980, abandoned.

[30] Foreign Application Priority Data

Jun. 21, 1979 [DE] Fed. Rep. of Germany ... 7917854[U]
Jun. 10, 1981 [DE] Fed. Rep. of Germany ... 8117194[U]
Feb. 3, 1982 [DE] Fed. Rep. of Germany ... 8202713[U]

[51] Int. Cl.$^4$ .............. E05F 15/16; E05F 15/20; F16P 5/00
[52] U.S. Cl. ...................... 192/150; 49/28; 49/199; 192/67 R; 474/134
[58] Field of Search ............ 192/150, 67 R, 30 V, 192/115; 474/134; 49/199, 28, 139; 200/61.62; 318/475, 469

[56] References Cited

U.S. PATENT DOCUMENTS

| | | | |
|---|---|---|---|
| 2,114,633 | 4/1938 | Hedges | 192/67 R |
| 2,387,533 | 10/1945 | Schmucker | 318/475 X |
| 2,588,880 | 3/1952 | Richards | 474/134 X |
| 2,766,417 | 10/1956 | Merritt | 318/475 |
| 2,900,831 | 8/1959 | Wilson et al. | 192/150 X |
| 3,012,520 | 12/1961 | Curtis | 49/199 X |
| 3,403,474 | 10/1968 | Spasoff | 49/28 X |
| 3,480,746 | 11/1969 | Fry | 318/475 X |
| 4,099,704 | 7/1978 | Okumura et al. | 318/469 X |
| 4,131,830 | 12/1978 | Lee et al. | 49/139 X |

FOREIGN PATENT DOCUMENTS

2527298 12/1976 Fed. Rep. of Germany .... 192/67 R
7817731 12/1978 Fed. Rep. of Germany .

Primary Examiner—Rodney H. Bonck
Attorney, Agent, or Firm—Antonelli, Terry & Wands

[57] ABSTRACT

A door operated drive assembly comprising an electric drive motor mechanically connected to a door pulling device by a transmission in the form of a belt drive or the like, utilizes an extension of a plate that is swingable in response to deviations of application pressure of the drive belt on belt guide pulleys carried thereby to trigger a switching arrangement utilized to trigger stopping or reversal of the drive motor. In order to make actuation of the switching arrangement a function of the degree of pressure applied by the drive belt, the plate is elastically loaded toward a middle position of its range of swingable movement. The elastic loading of the plate in accordance with a first embodiment is by way of two-arm springs positioned at opposite sides thereof, and in a second embodiment is produced by helical springs which act via actuators, on opposite sides of the plate extension. In both embodiments, the extension reaches to a position adjacent the switching arrangement, but, in the first embodiment, the extension comprises a pair of shields and the switching arrangement comprises a single photoelectric arrangement disposed therebetween, while, in the second embodiment, the extension is a straight projecting arm and the switching arrangement is a pair of switches disposed at opposite sides thereof. In accordance with a feature common to either embodiment, the drive arrangement is mounted in a multiple-component housing that comprises two components which are shiftable relative to each other between an operating position in which the drive motor is mechanically connected to a door pulley means, and a disconnected position in which the mechanical connection is interrupted.

32 Claims, 7 Drawing Figures

DRIVE ASSEMBLY FOR DOOR OPERATOR

This application is a Continuation-In-Part of co-pending U.S. patent application Ser. No. 162,088, filed June 23, 1980 and now abandoned.

BACKGROUND AND SUMMARY OF THE INVENTION

The invention relates to a door operator comprising an electric drive motor unit mechanically connected to pulling means for a single or multiple panel door by a belt drive or the like. The belt is guided positively by three pulleys. The middle pulley is a drive pulley mounted on or integral with the motor drive shaft, and the other two pulleys are guide pulleys mounted on portions of a plate located on both sides of the drive pulley and pivotable on a shaft parallel to the drive shaft. The plate, which is spring loaded toward the middle position of its pivoting range, is provided with an extension which engages switching means located in the path of plate motion.

The door operator structure is used to monitor the door panel motion in case an obstacle is present in the path of the door. The obstacle may be a vehicle, another object, or even a person. For this reason, means are provided (sometimes by law in many areas) to stop or reverse the door motion in the presence of such an obstacle.

In this case, the drive belt connected to the motor unit to transmit the drive motion to the door drive means has been guided by two pulleys around said drive pulley mounted on or integral with the motor unit output element in such a manner as to provide for a sufficiently wide loop angle for the transmission of the drive power from the drive pulley to the belt, see German Gebrauchsmuster No. 7,817,731.

Mounting of at least the guide pulleys on a plate which is pivotable about an axis located outside the output shaft axis makes it possible for the belt portion under greater load, depending on the direction of drive, to apply on its pulley a force stronger than that applied by the other belt portion on its own guide pulley. When, because of the presence of an obstacle in the path of door motion, a particularly heavy load is applied to one belt portion while the motor drive continues, the plate is deflected by the belt under heavier load and operates, by way of an extension thereof, on one of the two switches. One of these switches stops or reverses the motor, so that the door moves away from the obstacle. The other switch, arranged in the other direction of plate deflection, also provides for stopping or reversing the motor to the opposite direction of door motion or motor drive. The fact that the basic loads related to the door motion may differ in the open position and the closed position is taken into account by adjusting the switch actuator. With normal load, depending on the belt portion under load, the spring loaded plate is deflected in one or the other direction by a longer or shorter distance without actuating the switch concerned. It is only when a determined deflection value is exceeded that one of the two adjustable stops of the extension engages one or the other switch. Therefore, this accident-preventing switching arrangement is primarily responsive to the amount of deflection. This entails disadvantages because a determined amount of deflection is allowed for the normal load range, which may result in plate rocking even with weak motion resistance in the normal load range, which, at appropriate resonance, triggers the switching arrangement even in the absence of an obstacle. Consideration must be given in this connection to the load variations which are applied by variable wind pressures on the door.

For the above reasons, the threshold value for door motion inhibition should be adjustable on the basis of local conditions such as wind effects. Moreover, the door should be operable manually when the drive operation is faulty or has failed. Generally, satisfactory accessibility to the device is desirable for the easy adjustment of the above-cited safety threshold value and disconnection of the drive on failure.

Thus, an object of the invention is to provide a door drive of this type which operates exactly and separately in normal operation and accident-preventing operations, and also generally permits an improved adjustment of the actuation threshold values in response to belt tension.

The invention also relates to the adjustment of the stopping or reversing of the drive motor when an obstacle is present in the path of motion of the door with the highest possible sensitivity; and to the reduction of production costs.

Finally, another object of the invention is to provide a drive unit which requires low-maintenance, generally, and particularly relative to the adjustment of the safety threshold value.

According to the invention, the drive motor is stopped or reversed for accident prevention in the presence of an obstacle by a force-responsive value determination. The actuating elements for the switch, switch covers, or the like, which can be mounted in fixed position, are located more or less directly on either side of the extension of the pivotable plate. The springs act on both sides of the extension and their values in the inactive state are predetermined so as to be large enough that, in normal operation, a deflection of the plate will not occur that could actuate one of the switches. Only for accident prevention, i.e., when the resistance to movement is sufficiently strong and its value rises above the level indicative of an obstacle, will the drive motor be reversed or stopped. Since the adjustment can be made precise by varying the spring load, in normal operation, plate deflection practically does not occur and no rocking develops in normal operation in response to relatively small periodic disturbances in the door motion. Therefore, the drive of the invention operates faultlessly with sensitive adjustment of the threshold from which the resistance corresponding to accident prevention rises.

In another embodiment of the invention, no switch with springs is used, but a photoelectric cell is influenced by a shield when the plate is deflected in response to an obstacle, so that the beam path between the photoelectric cell transmitter and receiver is interrupted. To adjust the switching threshold value, the plate is in contact with adjustable springs whose characteristic is thus responsive exclusively to the force ratios for which the plate deflection determining the switch condition occurs. The photoelectric cell also offers the advantage that it can be operated as a normally closed contact switch, i.e., is always on, when the drive is operative. If the photoelectric cell fails or its operation is otherwise affected, the danger of the drive operating in the presence of an obstacle is avoided.

In a preferred form of this embodiment, the shield part comprises elements near the middle of the plate deflection range, on both sides of the beam path, so that always the same photoelectric cell is operated for both directions of deflection. Therefore, only one switch is needed. Basically, the beam path of the photoelectric cell can be directed perpendicularly to the plane of the plate. In another embodiment, the photoelectric cell beam path may be parallel to the plane of the plate, which, in some cases, provides for an advantage in respect to the space occupied by the structure. The structure of the shield part or shield elements is readily adaptable to this embodiment.

The springs which engage the plate on opposite sides are preferably in the form of two-armed springs pivotably mounted on a pin. The ends of the arms of said springs extending away from the plate are in contact with setscrews which are threaded into a fixed part. This fixed part is preferably the edge of the frame housing which holds the motor, the plate, and the motor-driven output pulley and can be provided with appropriate threads. Therefore, the adjustment can be effected outside the housing.

In another preferred development, the belt is in the form of a toothed belt which engages corresponding teeth of the drive pulley or motor output shaft, or of the output pulley. Thus, no problems arise in the necessary securing of the belt engagement, and the plate need not be adjusted.

The low-maintenance requirement and the device structure providing for the adjustment of the threshold value are taken into consideration by providing the housing with a housing frame component and a second component which holds the drive unit and is connected by a guide to the frame in which said housing component is movable between an operating position, in which the motor is mechanically connected to the door, and a disconnected position in which the mechanical connection is disengaged.

In the event of a malfunction in the drive unit, according to the invention, the mechanical connection of said unit with the door can be discontinued without disassembling the drive unit since the drive unit remains in the guide on disconnection and remains connected to the frame component of the housing. The shift in the guide between the operating position and the disconnected position is simple so that it can be effected by an unskilled person. Consequently, even an unskilled person can move the door manually on occurrence of a fault, without waiting for a specialist, and without the risk of damage to the mechanical connection between the door and the motor when the force is applied in the direction opposite to that of normal operation.

As a result of the shiftability of the drive unit in the guide, according to the invention, the specialist can effect repairs without disassembling the drive unit. When, at least some of the parts of the units must be changed, the unit or the intermediate housing is removed from the guides. Therefore, repair and possible prescribed maintenance are considerably simpler.

In an especially preferred embodiment of the invention, the electric power supply is interrupted when the drive is shifted in the guides for the mechanical disconnection. This provision reduces the risk of damage to the drive unit due to continued current supply in case of malfunction, and makes it possible for the specialist to conduct maintenance or repairs without risk of electrical shocks, unanticipated short circuits, or the like.

Another preferred embodiment provides for the separation of at least the mechanical connection in a first disconnection step, and then for a second disconnection step for the motor drive unit, in which the housing cover is removed. Thus, in the event of a malfunction, an unskilled person can move the door manually, and then the drive unit is made accessible to a specialist in the second disconnection step.

In still another advantageous development, the connection and/or the intermediate housing component and, optionally, also the frame component are made of elastic plastic material to avoid the transmission of vibrations, caused by the motor or the stepdown transmission, to the door acting as resonator, or the fixed portion of the housing.

These and further objects, features and advantages of the present invention will become more obvious from the following description when taken in connection with the accompanying drawings which show, for purposes of illustration only, several embodiments in accordance with the present invention.

BRIEF DESCRIPTION OF THE DRAWINGS

FIG. 2 is a partial horizontal sectional view of a motor drive unit as in FIG. 1, in accordance with a first embodiment of the invention, with FIG. 2a being a sectional view taken along line A—A of FIG. 2;

DETAILED DESCRIPTION OF THE PREFERRED EMBODIMENTS

Figure 1:
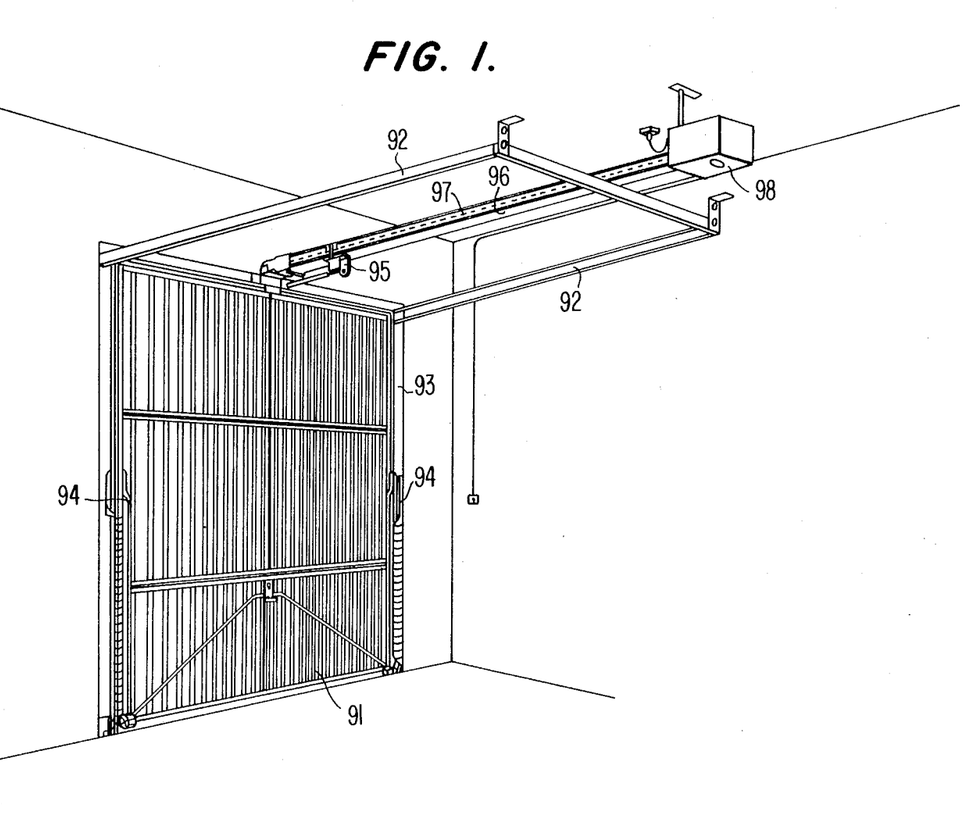
FIG. 1 is a schematic perspective view of a door with a drive of the type to which the present invention is directed.

To clarify with an example the application of the drive considered, FIG. 1 is a perspective view of a closed single-panel, up-and-over door. The upper edges of the door 91 are guided on the right and left sides by rollers in horizontal guide rails 92. Guides 94 are provided on the jambs 93 for additional guidance of the door.

Figure 5:
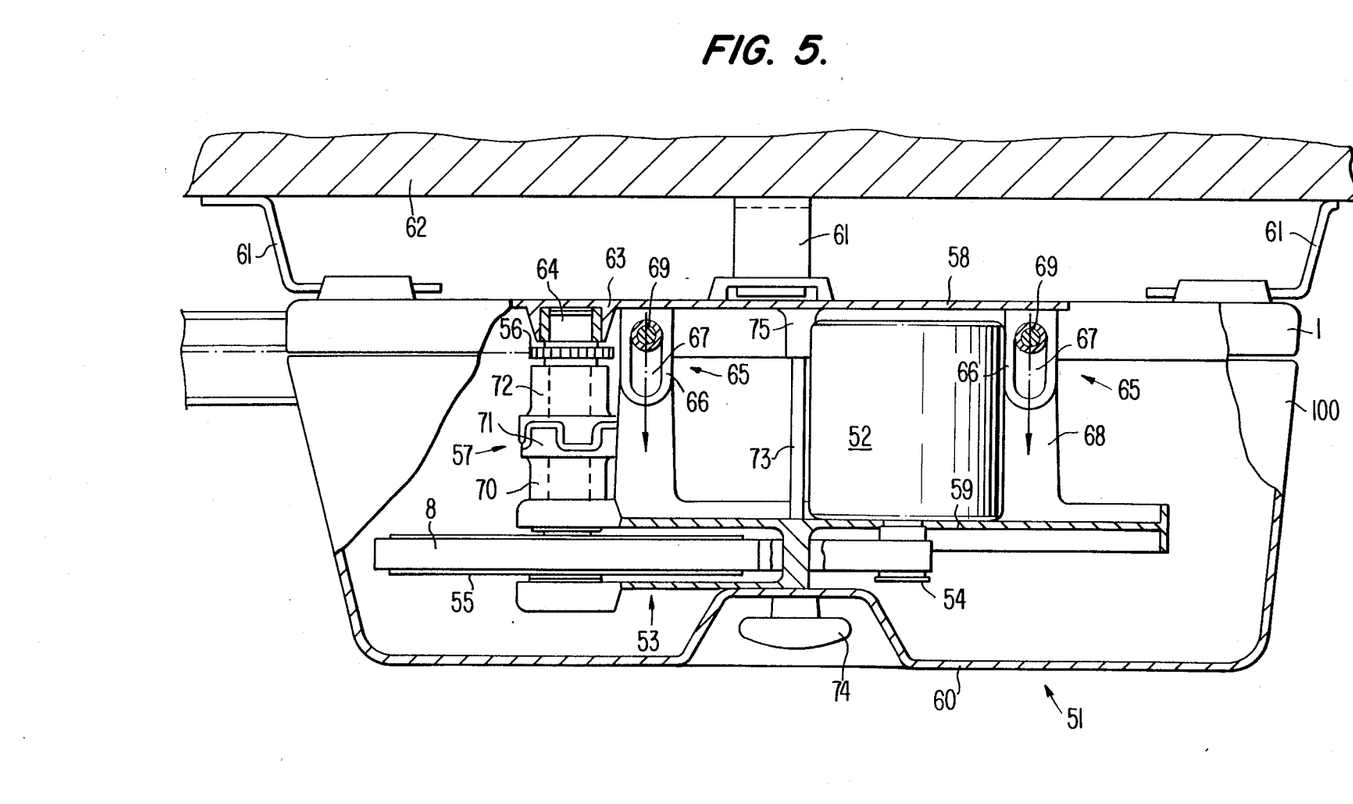
FIG. 5 is a cross section of the drive motor unit of FIG. 1, in accordance with another embodiment.
Figure 6:
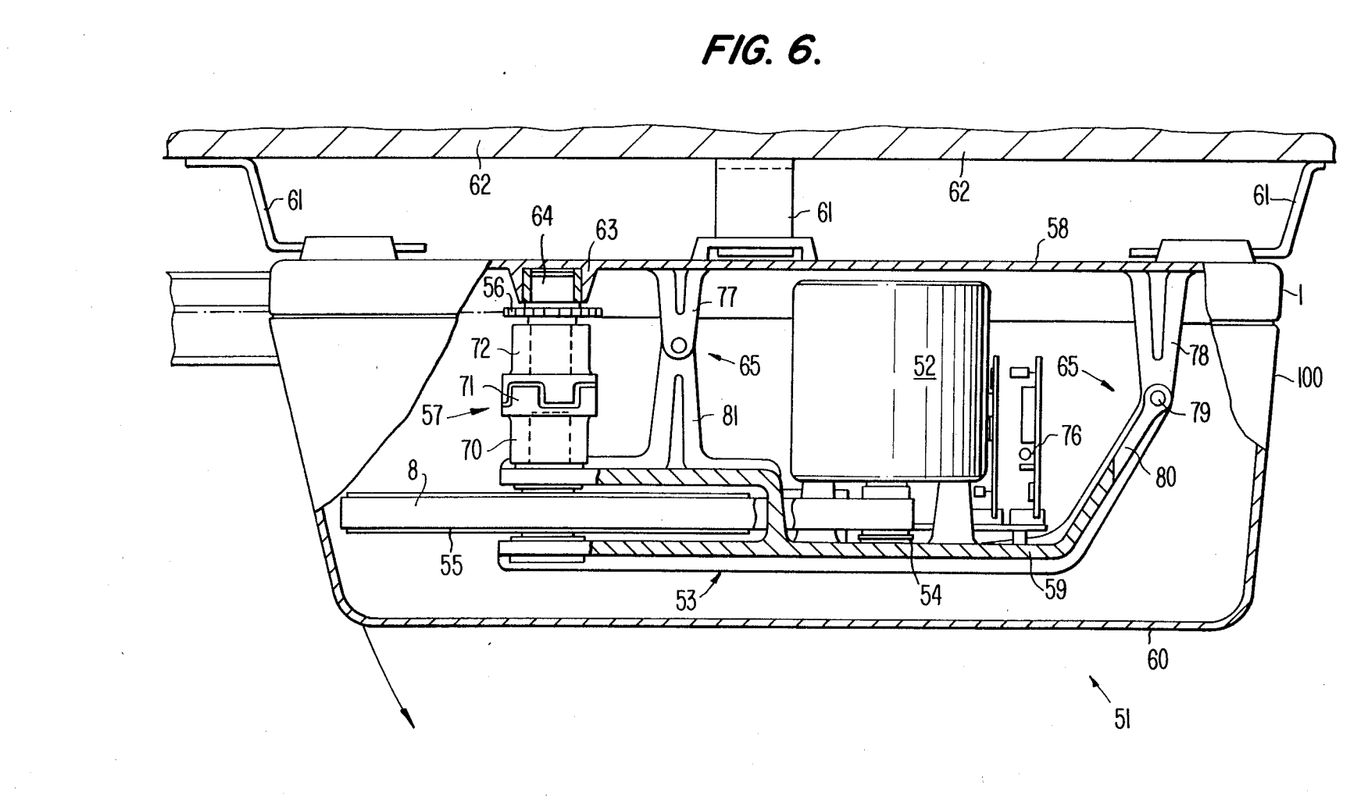
FIG. 6 is a cross section of the motor drive unit of FIG. 1, in accordance with a further embodiment of the invention.

A carriage 95 is pivotably connected to the door and longitudinally movable along a rail 96 parallel to guide rails 92. Carriage 95 is attached to an endless chain 97 which passes over a deflecting sprocket at the door end of rail 96, and a drive sprocket that is driven by drive unit 98 at the other end of rail 96. In the embodiments of FIGS. 5 and 6, the drive sprocket is designated by numeral 56 and driven by an output pulley 55 in said figures, or 7 in FIG. 2. A similar arrangement is utilized, but not shown, with respect to the FIG. 3 embodiment.

Figures 2, 2A:
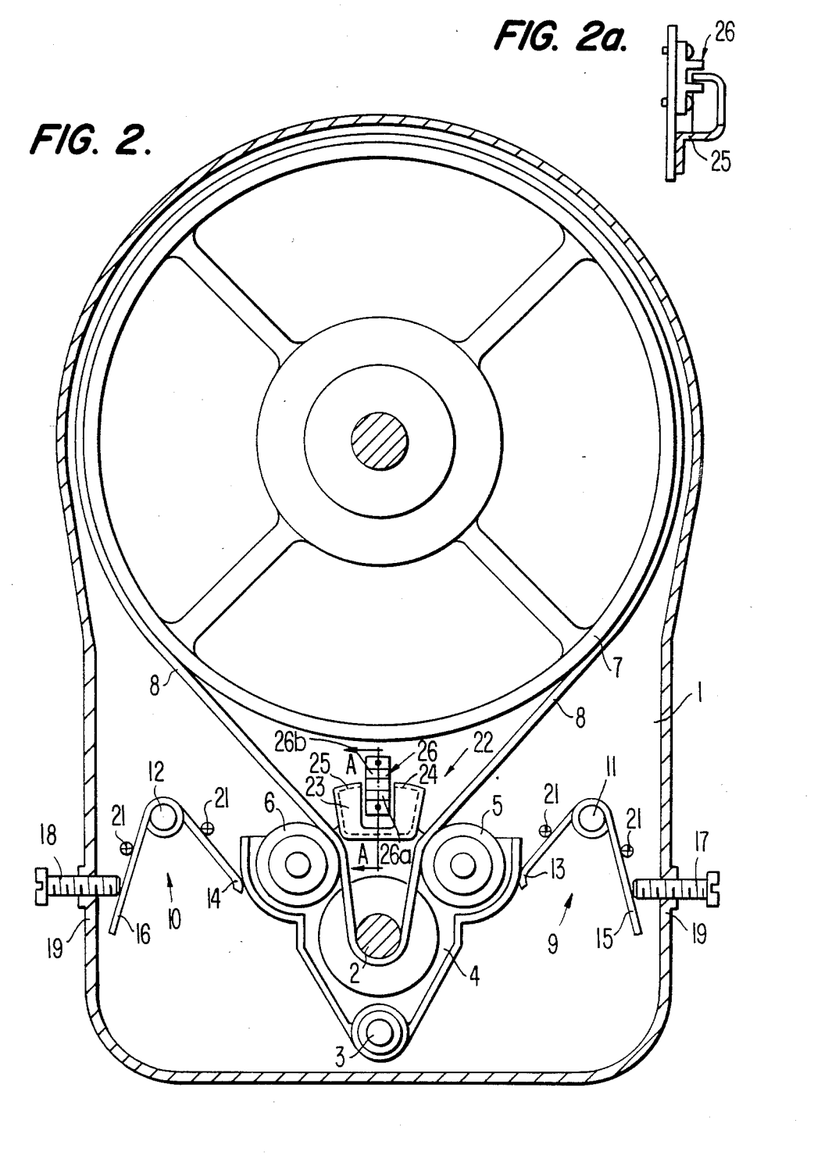

In the first embodiment represented in FIG. 2, a two-part housing for drive unit 98, which contains the motor, the plate and the chain drive sprocket by means which are not represented, appears only as its frame component 1. The motor (not shown), which drives a belt drive pulley 2, is fixed to said frame component 1. A plate 4 is pivotally mounted on a pin 3 that extends parallel to and axially spaced from belt drive pulley 2. The plate 4 carries two belt guide pulleys 5 and 6, which are in contact with the outside surface of the two portions of a belt 8 that extends from belt drive pulley 2 to the output pulley 7. The two belt portions are, thus, held mutually out of line so that, when the motor is running and the speed of output pulley 7 is braked by an obstacle, said pulley deflects plate 4, in a manner determined by the belt portion that is tensioned in accordance with the direction of rotation, by forcing outward the belt guide pulley 5 or 6 concerned. The braking of output pulley 7, relative to the speed of drive pulley 2, is caused by an obstacle in the path of motion of the door since the door motion is reduced accordingly, and transmitted to output pulley 7 by the chain.

On each of opposite sides of the plate 4, a respective one of two-armed springs 9 and 10 is retained on a respective one of pins 11 and 12, which are fixed to the housing. One spring arm, 13 or 14, is in contact with a respective side of the plate 4, and the other spring arm, 15 or 16, is in contact with an inner face of the setscrew 17 or 18, which is engaged in a threaded hole, 19 or 20, in a wall of the frame component 1. The spreading motion of the two-armed springs is limited by stops 21, which are in contact with the arms.

Near the middle, widthwise of the portion of plate 4 disposed on the side opposite to that receiving pin 3 and closest to output pulley 7, an extension 22 is provided. The extension 22 carries a shield part generally designated by numeral 23. This shield part comprises two elements 24 and 25 in the form of projections oriented substantially at a right angle to the bottom plane of frame 1. Observed from the top, these projections end a short distance from the beam path of a photoelectric cell 26, which is located between the screen elements 24, 25 when the plate is in the illustrated central position, and whose beam is not interrupted in this condition, which is the normal operating condition, and in which control switch contacts are closed.

As clearly apparent, especially in the drawing, the load applied by two-armed springs 9 and 10 on the sides of plate 4 can be finely adjusted by turning setscrews 17 and 18. The load force determines the threshold value of the belt tension. When this value is exceeded, plate 4 is deflected to the right or to the left, depending on the belt direction of motion, and the right or left screen element 24 or 25 penetrates the beam of the photoelectric cell, and, therefore, stops or reverses the motor. For this purpose, optical switching means (not shown) are placed beyond the photoelectric cell. While, in the illustrated embodiment, beam interruption is produced by one of vertically oriented shield elements passing between transmitter and receiver parts 26a, 26b of cell 26, horizontal shield parts passing between transmitter and receiver parts located above and below same may also be utilized.

The belt is provided with internal teeth (not shown) which engage the corresponding teeth of belt drive pulley 2 and output pulley 7. Since no slip can then develop, the belt tension need not be adjusted, for example, by varying the distance from plate 4.

Figure 3:
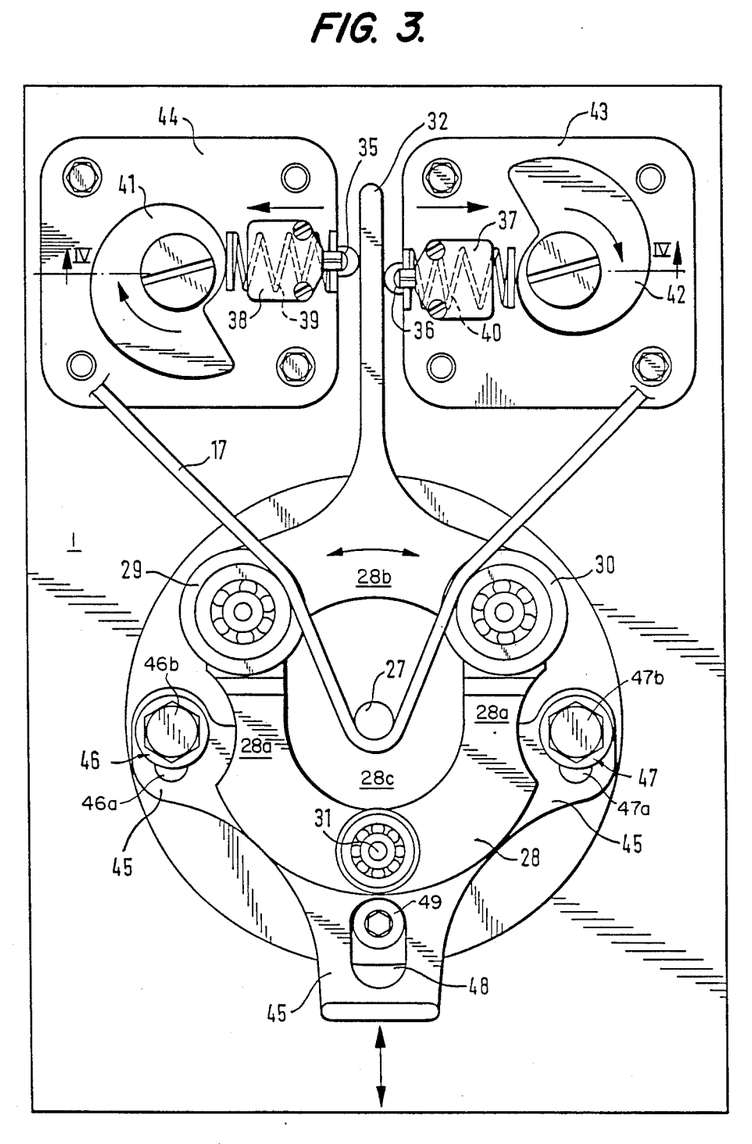
FIG. 3 is a horizontal sectional view of the motor drive unit as in FIG. 1, in accordance with a second embodiment of the invention.
Figure 4:
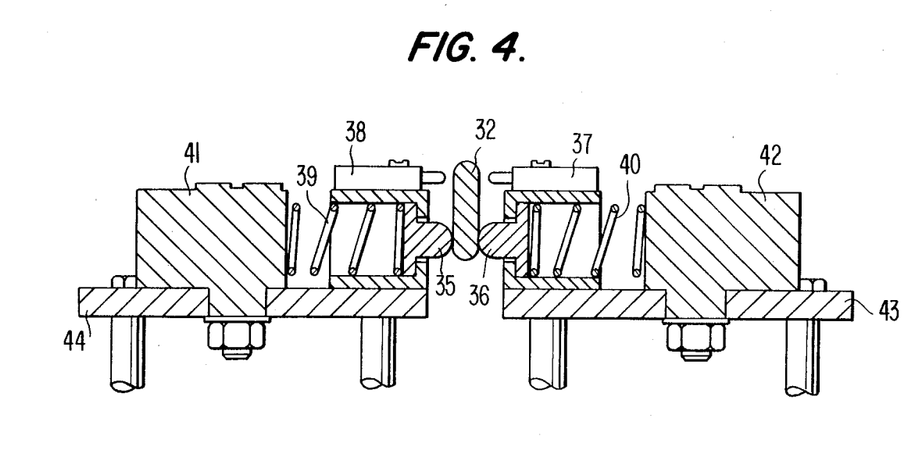
FIG. 4 is a sectional view along line IV—IV in FIG. 3.

In the embodiment of FIGS. 3 and 4, the portion of the motor drive to which the provisions and preferred structures of the invention refer are represented. In addition, basically similar developments derived therefrom can be adopted, such as those disclosed in the embodiment of German Gebrauchsmuster (Utility Model) No. 7,817,731, reference to which is made here is this respect. In principle, it is certainly possible also to construct a door drive provided with the characteristic features determining the present form, so that the drive belt, or, for example, a chain or a pulling means, moves the door directly.

As with the first embodiment, in this embodiment, drive belt 8 extends around a drive shaft or drive pulley and an output pulley, and between a pair of guide pulleys. In this embodiment, the drive shaft is designated 27, the guide pulleys 29 and 30, and the output pulley equivalent to pulley 7 of the first embodiment is not shown. The pair of belt guide pulleys 29 and 30 form the ends of two free arms of a sort of triangular configuration whose vertex is the belt drive shaft 27, or can be a pulley which is attached coaxially on the output shaft of the drive motor unit as in the first embodiment.

Similar to the object of the above-cited Gebrauchsmuster, belt guide pulleys 29 and 30 are mounted on a plate 28 which is pivotably mounted on a shaft 31 that is parallel to drive shaft 27. In this case, the two guide pulleys are placed on arms 28a which extend on both sides of the output shaft. Plate 28 consists of a root piece, at the base end of the plate that is pivotable about shaft 31, the two arms 28a carrying guide pulleys 29 and 30, which form fork portions branching from the root piece, and an extension 32 which, in the present embodiment, extends away from shafts 31 and 27 in a straight line on a connector portion 28b located between arms 28a, and because the ends of the fork arms 28a, carrying guide pulleys 29 and 30, are so connected with each other, a plate is formed which is provided with an opening 28c in which output shaft 27 is placed and can move freely, even with maximum swinging of the plate.

As apparent from the drawing, the actuators 35 and 36 of switches 37 and 38 engage the lateral surfaces of the extension 32 practically without play in such a manner that one of switches 37, 38 is actuated when plate 28 is deflected in one direction, and the other switch when the plate is deflected in the other direction. As determined by the structural form, actuators 35 and 36 can actuate the switches directly or indirectly. The actuators are held stationary in the represented inactive position by the load force of one of the related coil springs 39 and 40. Thus, each actuator can be moved with movement of extension 32 toward it and its associated one of the switches, but does not follow extension 32 when movement of the plate 28 shifts it from the position shown toward the other of the switches 37, 38.

Each switch 37, 38 cooperates with one actuator 35, 36, which actuator is pressed by a spring 39 or 40 of each switching unit. The rear ends of the springs 39, 40, i.e., the ends away from extension 32, are in contact with adjusting means 42 and 41. The adjusting means are in the form of cams which are rotatable about screws in the direction indicated by arrows in the drawing. In regard to each screw and related axis of rotation, the cam surfaces are in the form of spirals, so that, for different positions of the cams, the distance between the axis of rotation and the rear end of the corresponding spring can be adjusted accordingly. Therefore, a highly precise, easily effected, continuously variable adjustment of the spring load is obtained. Thus, the nominal value of the belt load for which the plate and, therefore, extension 32 can be deflected and carry along actuators 35 and 36 against the preset force of springs 39 and 40, can be adapted to occurring usage conditions.

The two switches 37, 38 with related actuators 35, 36, springs 39, 40 and adjusting means 41, 42, are advantageously made in identical form for both sides of extension 32. The parts that are associated with each other are preassembled on a support plate 43 or 44 as units that may be mounted at either side of extension 32 by merely rotating same by 180°, thereby contributing to favorable manufacturing considerations. Individually actuated adjusting means 41 and 42 permit the consideration of different faults in the door opening and closing motions, despite the identicality of the switch units.

In the two directions of motion, different threshold values may be introduced for obstacles triggering accident-responding disconnection. Therefore, beside the exact adjustment based on the limited play or no-play switching arrangement cooperating with the extension in normal operation, the structure of the invention for the door operator is such that malfunctions in the motion processes do not result in corresponding pendulum motions of the plate, so that the system can be unstable in normal operation, yet false indications or simulations of the presence of an obstacle will not result in the accident-responsive disconnection of the drive being produced.

Since the belt tension is another factor in the regulation of the entire system, this tension is adjustable. This condition is simply obtained by securing the shaft 31, about which plate 28 is pivotable, to a support plate 45 which is adjustable by bolt and slot connections 46 and 47, so that the distance between drive shaft 27 and the shafts of belt guide pulleys 29 and 30 is adjustable. To effect as much as possible the same adjustment for the two belt portions, the slots 46a, 47a are parallel to the bisector of the vertex angle of the triangle formed by drive shaft 27 (vertex) and the two pulleys 39 and 30 (free legs). Since extension 32 is also oriented in this direction, when the shifting of the bolts 46b, 47b in the slots 46a, 47a is exactly straight, there is no variation in the application of extension 32 on actuators 35 and 36. To obtain such a straight shift, support plate 45 is provided with an additional slot 48 which is in line with the noted bisector and engaged by a guide pin 49. As a result of this, a three-point attachment of support plate 45 and plate 28 mounted thereon is achieved, and they can be moved only in the direction of the slots. Thus, they can be fixed in different positions as determined by the desired tension of belt 8 or at equivalent distances between output shaft 27 and belt guide pulleys 29 and 30, without affecting the interaction between extension 32 and the switch units.

FIG. 5 is a view partly in section of one embodiment of a door operator with a pulling chain drive.

FIG. 6 is a view partly in section of another embodiment of such a door operator.

In the embodiments of FIGS. 5 and 6, a housing generally designated by numeral 51 contains a drive motor 52 connected to a clutch, generally designated by numeral 57, by a step-down transmission 53 consisting of two V-belt pulleys 54 and 55 interconnected by a V-belt 8'. The smaller pulley 54 constitutes the rotor of the motor and larger pulley 55 is coaxial with a drive sprocket 56. Sprocket 56 engages a chain (simply represented by a dot-and-dash line) which is guided along a rail 58. In a manner such as shown in FIG. 1, a return sprocket is arranged at the other end of the rail, so that the chain extends continuously between the two sprockets and is connected to a door. Depending on the direction of rotation of motor 52, the pulling member reciprocates on one of the portions of the chain between two positions. The door is closed in one position, and open in the other position.

Housing 51 consists of a frame component 58, a second component 59, and a cover 60. At least the second housing component is made of vibration-damping material. Frame component 58 is provided with brackets 61 to fix the housing in position, for example, on a garage ceiling 62. A bearing 63 for the shaft 64 of output sprocket 56 is provided on the inside surface of frame component 58. A part of a guide generally designated by numeral 65, on which second housing component 59 is connected to frame component 58, is fixed to or built into the bottom of frame component 58.

In the embodiment of FIG. 5, four guides 65 are arranged at right angles to frame 58. In the partial section shown, only two of these guides are visible. Each of the guides comprises a projection 66, formed on the bottom of frame component 58, which extends perpendicularly to said bottom, and in which an elongated slot 67 is formed. On second housing component 59, extensions 68 are directed toward the bottom of frame component 58. The ends of the extensions proximate to the bottom are provided with pins 69 which penetrate slots 67. Thus, second housing component 59 can be moved in the direction of slots 67 relative to frame component 58, between two end positions. The position in which second housing component 59 is closest to frame component 58 is the operating position, as apparent from the drawing.

Drive motor 52 and step-down transmission 53 are mounted in second housing component 59. One half 70 of clutch 57 is keyed to the shaft of drive pulley 55. The dogs 71 of the said clutch half engage corresponding recesses in the other clutch half 72 which is keyed to output pulley 56. At least the contact surfaces of the clutch are made of vibration-damping material. In this operating position, the shaft of motor 52 is mechanically connected to output pulley 56 by step-down transmission 53 and belt 8 (see FIGS. 1–4) and clutch 57, so that the chain of the pulling chain drive is moved. In this regard, it is intended that pulley 55 correspond to pulley 7 and pulley 54 to either pulley 2 or shaft 27, with the corresponding malfunction switching arrangement interposed therebetween, the latter being omitted from FIGS. 5, 6 for ease in illustration only. The frame component 1 in FIGS. 2 and 3 may be a part of second component 59 in FIGS. 5 and 6.

Housing cover 60 and second housing component 59 are provided with aligned holes into which a screw 73 is introduced. The end of said screw projecting from cover 60 is provided with a knob 74, and the other end thereof engages a thread 75 formed in the bottom of frame component 58.

When screw 73 is rotated out of thread 75, the pins 69 of second housing component 59 move in slots 67 to a position of the slot connection for which second housing component 59 is separated by the maximum distance from frame bottom 58. The drive elements mounted on second housing component 59, specifically motor 52, step-down transmission 53, and clutch half 70 also move away with the said component, so that the dogs 71 of clutch half 70 move out of the recesses in clutch half 72. Therefore, the motor is mechanically separated from output pulley 56 which can rotate freely as the chain is moved on manual operation of the door. In this uncoupled position, the two halves 86 and 87 of an electric plug connection 85 joining the electric supply lines 88, and possible control lines, are separated. As shown in FIG. 6, control circuits 76 can be provided in second housing component 59. In any case, the electric plug connection 85 is closed or opened with engagement and disengagement of clutch 57, when second housing component 59 is moved in guide 65 between the operating position and the disconnected position. Therefore, the electric elements mounted in housing component 59 are not supplied current when second housing component 59 has been moved to the disconnected position.

When screw 73 has been moved completely out of thread 75, it can be pulled through the hole (not shown) in second housing component 59, and cover 60 can be removed from the housing. In this position, the parts of the drive unit are accessible without risk since the current supply has been interrupted on separation of the electric plug connection. Clutch 57 is also disengaged, so that the moving parts of the drive unit can be easily rotated manually, for example, for maintenance.

The length of the distance of engagement of screw 73 in thread 75 can be determined so that clutch 57 is disengaged after screw 73 has been rotated a first distance out of thread 75, so that, in the event of a malfunction in the drive unit, the door can be moved manually as previously disclosed. Screw 73 is fully released after further rotation, so that cover 60 can be removed.

In the embodiment represented in FIG. 6, only the structure of guide 65 between frame component 58 and second housing component 59 has been modified, the other elements being identical, so that reference can be made to the appropriate description of the embodiment of FIG. 5.

In the embodiment represented in FIG. 6, two projecting bearing brackets 77 and 78 are provided in frame component 58. Bracket 78 carries a pivot bearing with a pin 79 about which one end 80 of second housing component 59 is pivotable. Opposite bearing bracket 77, second housing component 59 is provided with a support bracket 81 which engages bearing bracket 77 so that holes present in the two brackets can be aligned. Then a pin, retaining rod, or the like (not shown) can be removably introduced into the holes through an opening in the cover 60 as will be readily apparent to be skilled artisan. to prevent the pivoting of second housing component 59 in the indicated operating position. In this operating position, the halves 70 and 72 of clutch 57 are engaged and the drive motion of motor 52 is transmitted to output pulley 56.

When the connection between bearing bracket 77 and support bracket 81 is separated, second housing component 59 can be pivoted about pin 79, so that clutch 57 is disengaged. In this disconnecting motion, i.e., in the transition from the operating position to the disconnected position (not shown), an electric plug connection is acted upon so as to be coupled in the operating position represented, and moved to the disconnected position on pivoting of second housing component 59 about pin 79. Thus, the resulting conditions are the same as those disclosed in reference to FIG. 5.

In the present case, two successive separate operating phases can be provided for, for example, by uncoupling the connection between bearing bracket 77 and support bracket 81 while cover 60 is closed, second housing component 59 being subsequently moved to the disconnected position. In conditions which are not represented, the housing can be removed only by a specialist to provide for the accessibility of the drive unit for repairs and maintenance.

When the drive unit or parts thereof must be replaced, the pins 69 of the slot connections in the embodiment of FIG. 5, or the pivot pin 79 in the embodiment of FIG. 6, can be removed by taking simple locking means holding the pins in position out of their engagement position, so that second housing component 59 can be totally removed from frame component 58. Naturally, other disconnecting means may be provided, depending on the structure of the guide. The same remark applies to the structure of other components and elements.

While I have shown and described various embodiments in accordance with the present invention, it is understood that the same is not limited thereto, but is susceptible of numerous changes and modifications as known to those skilled in the art and I, therefore, do not wish to be limited to the details shown and described herein, but intend to cover all such changes and modifications as are encompassed by the scope of the appended claims.

I claim:

1. A door operator drive assembly comprising an electric drive motor mechanically connected to a door pulling means by a transmission in the form of a drive belt, the drive belt being movably supported on three pulleys and being in driven association with a motor output shaft, two of said pulleys being belt guide pulleys mounted on opposite sides of the motor output shaft on a plate which is swingable on a shaft that extends parallel to the motor output shaft so that the belt passes between the said two of the pulleys and about an output pulley, forming the third of said three pulleys, for driving a chain, and the plate being elastically loaded toward a middle position of its range of swingable movement and being provided with an extension means, extending to a position adjacent a switching arrangement located in the plate swinging range, for actuation thereof upon swinging of said plate from said middle position in response to deviations of application pressure of said drive belt on said belt guide pulleys sufficient to overcome said elastic loading, wherein adjusting means are provided for adjusting the elastic loading on said plate and wherein said extension means comprises a shield which penetrates a beam path between a transmitter and a receiver of a switching arrangement in the form of a photoelectric cell during said swinging of the plate from said middle position.

2. A door operator drive assembly as in claim 1, wherein the shield comprises shield elements in the middle of the range of swingable movement of the plate, on both sides of the beam path of the photoelectric cell.

3. A door operator drive assembly as in claim 2, wherein the beam path is substantially parallel to the plane of swingable movement of the plate.

4. A door operator drive assembly as in claim 1 or 2 or 3, wherein the elastic loading of the plate toward its middle position is produced by a spring arrangement comprising two-armed springs, one arm of which engages the plate at a respective one of opposite sides thereof, and the other of which is disposed away from the plate in contact with one end of a respective setscrew as said adjusting means, the setscrew being movably adjustable relative to said spring in a manner changing the elastic loading exerted by the respective spring that the plate must overcome in order to swing from said middle position toward said respective spring.

5. A door operator drive assembly as in claim 4, wherein threads for the setscrews are provided in opposite edges of a frame component of a housing of the drive assembly.

6. A door operator drive assembly as in claim 4, wherein a range of motion of the two arms of the springs away from each other is limited by stops.

7. A door operator drive assembly as in claim 6, wherein threads for the setscrews are provided in opposite edges of a frame component of a housing of the drive assembly.

8. A door operator drive assembly as in claim 6, wherein the drive belt is in the form of a toothed belt engaging corresponding teeth of the output pulley and of a belt drive pulley carried by said motor output shaft.

9. A door operator drive assembly comprising an electric drive motor mechanically connected to a door pulling means by a transmission in the form of a drive belt, the drive belt being movably supported on three pulleys and being in driven association with a motor output shaft, two of said pulleys being belt guide pulleys mounted on opposite sides of the motor output shaft on a plate which is swingable on a shaft that extends parallel to the motor output shaft so that the belt passes between the said two of the pulleys and about an output pulley, forming the third of said three pulleys, for driving a chain, and the plate being elastically loaded toward a middle position of its range of swingable movement and being provided with an extension means, extending to a position adjacent a switching arrangement located in the plate swinging range, for actuation thereof upon swinging of said plate from said middle position in response to deviations and application pressure of said drive belt on said belt guide pulleys sufficient to overcome said elastic loading, wherein adjusting means are provided for adjusting the elastic loading on said plate and wherein the switching arrangement comprising actuating elements located practically without clearance on opposite sides of the extension in the normal operating position of the plate, and retained in this position by springs for producing an elastic loading, the elastic loading force of each spring being variable by said adjusting means.

10. A door operator drive assembly as in claim 9, wherein the springs are in the form of coil springs extending parallel to a direction of actuation of the actuating elements, ends of the springs directed away from a contact surface of the actuating elements on the extension being engaged on edge surfaces of rotatable cams forming said adjusting means, said cam edge surfaces being in the form of spirals extending about an axis of rotation around which the cams are fixable in different positions.

11. A door operator drive assembly as in claim 10, wherein each cam is fixable in said different positions by a screw extending coaxially to the axis of rotation of the cam.

12. A door operator drive assembly as in claim 9 or 10 or 11, wherein each of the respective switches, actuating elements, springs, and the spring adjusting means are mounted on a respective support plate in a manner such that two units are formed that are identical in both directions of swing on the extension.

13. A door operator drive assembly as in claim 1 or 9, comprising a multiple component housing, wherein the housing comprises a first, frame, housing component and a second housing component in which the drive unit is mounted, said second housing component being connected to the frame component by guide means in which the second housing component is movable between an operating position in which the drive motor is mechanically connected to the door pulling means, and a disconnected position in which said mechanical connection is interrupted.

14. A door operator drive assembly comprising an electric drive motor mechanically connected to a door pulling means by a transmission in the form of a drive belt, the drive belt being movably supported on three pulleys and being in driven association with a motor output shaft, two of said pulleys being belt guide pulleys mounted on opposite sides of the motor output shaft on a plate which is swingable on a shaft that extends parallel to the motor output shaft so that the belt passes between the said two of the pulleys and about an output pulley, forming the third of said three pulleys, for driving a chain, and the plate being elastically loaded toward a middle position of its range of swingable movement and being provided with an extension means, extending to a position adjacent a switching arrangement located in the plate swinging range, for actuation thereof upon swinging of said plate from said middle position in response to deviations of application pressure of said drive belt on said guide pulleys sufficient to overcome said elastic loading, wherein the shaft on which the plate swings is fixed to a support plate which is movable and fixable relative to the motor output shaft in different positions producing different distances between the motor output shaft and the belt guide pulleys.

15. A door operator drive assembly as in claim 14, wherein bolt and slot structures are provided to fix the support plate in said different positions.

16. A door operator drive assembly as in claim 15, wherein the slots of said bolt and slot structures extend parallel to a line bisecting the vertex of a triangle formed by the motor output shaft, as apex, and the belt guide pulleys.

17. A door operator drive assembly comprising an electric drive motor mechanically connected to a door pulling means by a transmission in the form of a drive belt the drive belt being movably supported on three pulleys and being in driven association with a motor output shaft, two of said pulleys being belt guide pulleys mounted on opposite sides of the motor output shaft on a plate which is swingable on a shaft that extends parallel to the motor output shaft so that the belt passes between the said two of the pulleys and about an output pulley, forming the third of said three pulleys, for driving a chain, and the plate being elastically loaded toward a middle position of its range of swingable movement and being provided with an extension means, extending to a position adjacent a switching arrangement located in the plate swinging range, for actuation thereof upon swinging of said plate from said middle position in response to deviations of application pressure of said drive belt on said belt guide pulleys sufficient to overcome said elastic loading, and further comprising a multi-component housing, wherein the housing comprises a first, frame, housing component and a second housing component in which the drive unit is mounted, said second housing component being connected to the frame component by guide means in which the second housing component is movable between an operating position in which the drive motor is mechanically connected to the door pulling means, and a disconnected position in which said mechanical connection is interrupted.

18. A door operator drive assembly as in claim 17, wherein said transmission is a step-down transmission.

19. A door operator drive assembly as in claim 17, wherein a drive wheel is mounted in the frame component and the transmission of the drive unit includes a mechanical clutch which is engaged in the operating position of the second housing component, and disengaged in the disconnected position thereof.

20. A door operator drive assembly as in claim 17 or 18 or 19, wherein an electric plug connection for the drive motor is arranged between the frame component and the second housing component, said electrical connection being coupled in the operating position of the second housing component, and uncoupled in the disconnected position thereof.

21. A door operator drive assembly as in claim 19, wherein the mechanical clutch is a dog clutch.

22. A door operator drive assembly as in claim 21, wherein the pins of the slot-and-pin connections are disconnectable for enabling removal of said second housing component.

23. A door operator drive assembly as in claim 20 or 22, wherein at least the contact surfaces of the clutch are made of vibration-damping material.

24. A door operator drive assembly as in claim 18 or 20 or 22, wherein at least the second housing component is made of vibration-damping material.

25. A door operator drive assembly as in claim 18 or 20 or 22, wherein the guide means comprises a plurality of slot-and-pin connections.

26. A door operator drive assembly as in claim 25, wherein the housing is further comprised of a cover that is penetrated by a screw whose shank passes through the second housing component and is engaged in a thread provided in the frame component.

27. A door operator drive assembly as in claim 17 or 19, wherein the guide means is provided with a hinge whose position corresponding to the operating position of the second housing component is fixed by a locking element.

28. A door operator drive assembly as in claim 27, wherein the locking element comprises a pin.

29. A door operator drive assembly as in claim 19 or 21, wherein the clutch is coaxial to the axis of rotation of the door drive wheel and comprises a clutch half movable along said axis between the engaged and the disengaged positions.

30. A door operator drive assembly as in claim 29, wherein one half of the clutch is mounted on a shaft of the door drive wheel and the other half is mounted on an output pulley of the transmission.

31. A door operator drive assembly as in claim 30, wherein an electric plug connection for the drive motor is arranged between the frame component and the second housing component, said connection being coupled in the operating position of the second housing component, and uncoupled in the disconnected position thereof.

32. A door operator drive assembly as in claim 19 or 21, wherein the housing is further comprised of a cover that is penetrated by a screw whose shank passes through the second housing component and is engaged in a thread provided in the frame component; and wherein the clutch is disengaged on loosening the screw to a first screw-loosening degree, and the housing cover is removable on loosening of the screw to a second screw-loosening degree.

* * * * *